Patented Feb. 17, 1931

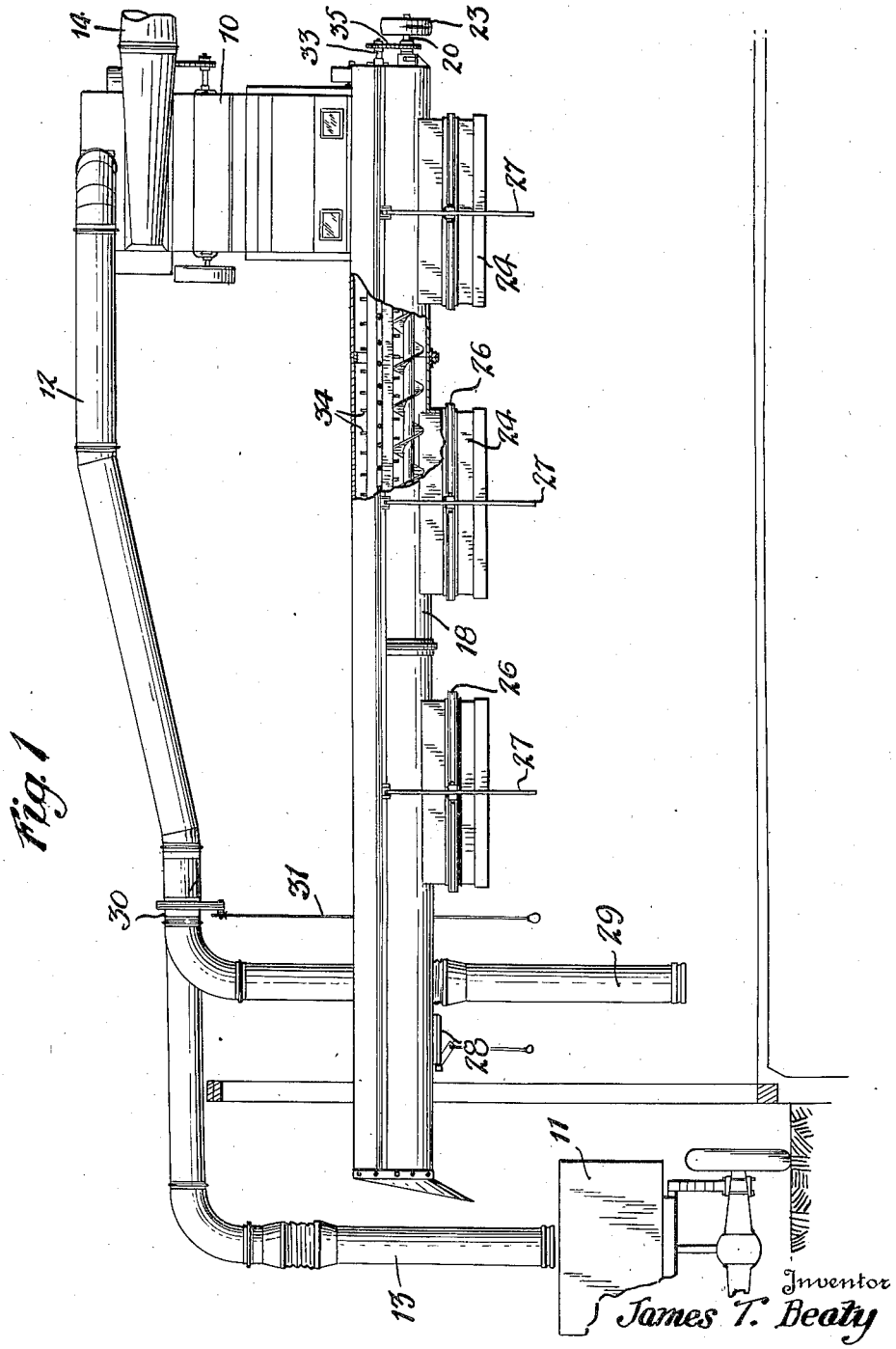

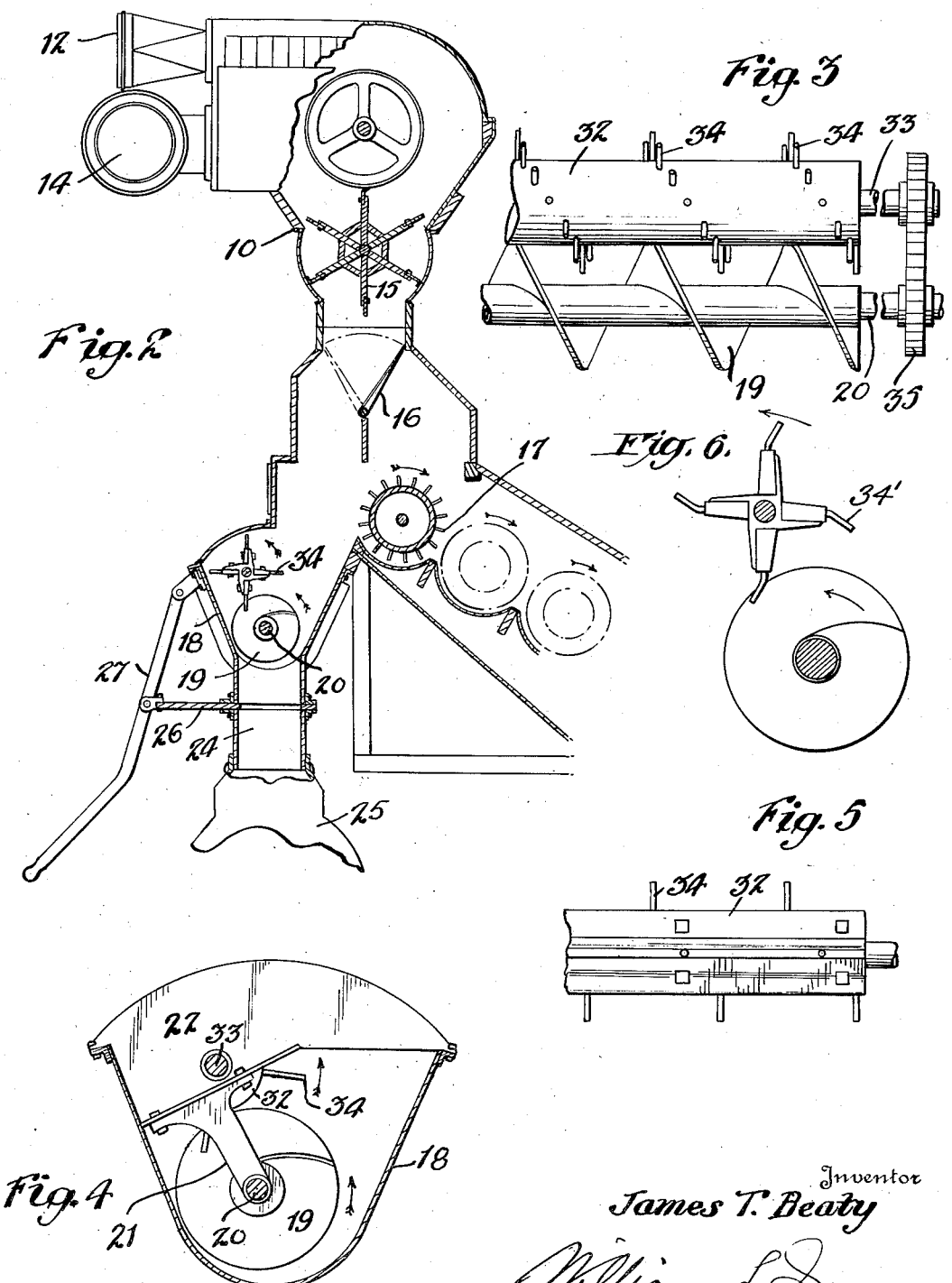

1,792,566

UNITED STATES PATENT OFFICE

JAMES T. BEATY, OF CHARLOTTE, NORTH CAROLINA

CONVEYER DISTRIBUTOR FOR COTTON-GINNING SYSTEMS

Application filed February 8, 1929. Serial No. 338,455.

My invention relates to cotton conveyers and more particularly to distributors for cotton ginning systems.

In the systems now in use, the gin feeders are arranged in a row and connected at their upper ends to a distributor casing which supplies cotton to the gins. An endless belt conveyer is arranged in the distributor casing and is provided with rows of spikes about twelve inches apart which engage the cotton and pull it through the casing to the various gin feeders. These spikes are very heavy, weighing about one-half a pound each, and consequently cause the belt to sag. In order to allow for this sagging of the belt, the distributor casing is made deeper than would otherwise be necessary, to provide sufficient clearance for the sagging spiked belt. With such an arrangement, some of the cotton is left in the distributor casing under the spikes, especially at the ends of the casing. As a result, one customer's cotton will be mixed with that of another, and the seed would also be mixed. This is a very undesirable situation, especially where a customer wishes to keep his planting seed separate or pure.

An important object of my invention is to provide a conveyer system which will avoid these disadvantages.

Another object of my invention is to provide a device of this character which will be simple in construction, installation and operation, inexpensive to manufacture and install, will require less power to operate than is required by the spiked belt systems, and which is strong and durable.

Other objects and advantages of my invention will be apparent during the course of the following description.

In the accompanying drawings which form a part of this specification and wherein like characters of reference denote like or corresponding parts throughout the same.

Figure 1 is a front elevation of my distributing system,

Figure 2 is a transverse sectional view thereof, parts being broken away,

Figure 3 is a fragmentary elevation of the screw conveyer and one form of the associated spiked roller, Figure 4 is a sectional view of the distributor casing showing the arrangement of the screw conveyer bracket, Figure 5 is a fragmentary elevation of another form of spiked roller, and Figure 6 is a sectional view of a roller showing a modified arrangement of spikes.

In the drawings, wherein for the purpose of illustration is shown a preferred embodiment of my invention, the numeral 10 designates a separator of the usual construction connected to the source of cotton supply illustrated as a wagon or truck 11 by means of a pipe 12 having the usual suction telescope 13 extending into the wagon. A pipe 14 connects the separator to the usual fan (not shown) for providing suction to carry the cotton to the separator. A revolving paddlewheel 15 is arranged in the separator as is also usual. The operation of this type of separator is well known in the art and may be briefly summarized as follows: The paddle wheel is arranged below the air separator screen drum so that the fan pulls the air through the screen drum and out of the end of the screen drum, the cotton sticking to the drum being knocked off by the paddlewheel and delivered through the valve 16 to the conveyer trough. The paddle wheel is usually provided with flaps of rubber, two of which are always in contact with the separator sides to prevent the breaking of the vacuum in the separator. It will be seen that the wagon 11 is on the outside of the building containing the cotton machinery and it is the usual custom for the driver to feed the cotton to the telescope 13.

A valve 16 is arranged below the paddlewheel 15 and can be moved to send the cotton to the cleaner 17 or directly to the conveyer to be distributed to the gins. The latter position is shown in full lines in Figure 2. The conveyer trough 18 is arranged below the valve 16 and adjoins the cleaner 17. The trough is of substantially V-shape in cross section with a rounded lower portion, and extends above the gins and gin feeders to a point outside the building and above the wagon or truck 11. A screw conveyer 19 extends the entire length of the trough and may be separated into as many sections as desired. The conveyer shaft 20 is journaled in suitable hangers 21 which are supported by cross beams or webs 22 as shown in Figure 4. The conveyer 19 and shaft 20 are arranged to one side of the center of the trough 18. In a conveyer trough about 28 inches at the top, 18 inches deep and 18 inches wide at the bottom, the conveyer screw is placed about one and one-quarter inch off center. This offset of the conveyer depends upon the direction of rotation of the screw. It is always offset to the non-carrying side in order to provide greater space on the carrying side without materially increasing the space between the bottom of the screw and the trough, the carrying side being that side on which the conveyer flight is moving upwardly.

The shaft 20 extends through the separator end of the trough and is provided with a pulley wheel 23 at its end to be engaged by a suitable power belt (not shown).

Spaced gin chutes or hoppers 24 open into the bottom of the conveyer trough and are connected to the gin feeders 25 which are of the usual construction and require no explanation. Slide valves 26 are arranged to close the chutes or hoppers 24 and are operated by pivoted levers 27.

A gate valve or trap-door 28 is arranged in the lower portion of the trough 18 beyond the last gin feeder and serves as an overflow when opened. A suction telescope 29 is arranged with its end adjacent the floor of the building and is connected to the pipe 12 by means of a suitable Y coupling 30. A valve is arranged in the coupling 30 and is operated by the chain or cord 31 to close the pipes to either the telescope 13 or the telescope 29.

Arranged above the spiral conveyer 19 and to the non-carrying side thereof is a kicker element such as a spiked roller 32 mounted on a shaft 33 journaled in the cross beams or webs 22. Spikes 34 are arranged spirally of the roller 32 and extend down between the convolutions of the screw 19 to a point adjacent the center thereof. The spikes are arranged in a spiral of the same pitch as that of the screw and the roller is rotated in the same direction and at the same speed as the screw conveyer by means of a chain 35 engaging suitable sprockets on the ends of the shafts 20 and 33.

The roller may be a plain roller as shown in Figure 3 or it may be fluted as shown in Figures 1, 2 and 5, in which form the roller is made up of a metallic body having radial arms to which longitudinally extending planks are bolted. The spikes may be arranged in a single spiral as shown in Figures 3 and 5 or they may be arranged in a double spiral as shown in Figure 1 with two spikes between each convolution of the conveyer screw. They must, however, be arranged at the same pitch and rotated at the same speed as the conveyer screw in order to clear the screw.

If the conveyer shaft and roller shaft are rotated in opposite directions from that indicated by the arrows in Figures 2 and 4, the shafts must be arranged on the other side of the center of the trough.

By offsetting the conveyer screw 19, its carrying capacity is greatly increased and choking is prevented. The spiked roller prevents the cotton from rotating with the spiral conveyer and throws it back to the carrying side thereof, thereby preventing choking of the screw and increasing its carrying capacity. As a result, less power is required to operate the screw, the belts will not be thrown off by choking of the screw, and the cotton will be carried faster than usual.

If desired, the spikes may be bent backwardly as shown at 34' in Figure 6 in order to prevent cotton being picked up by the spikes. With this improved arrangement of a screw conveyer and its associated spiked roller, the cotton is floated along on the carrying side of the conveyer, using only a small portion of the outer diameter of the conveyer flight. This action is in direct contrast to the "sausage mill" principle of filling up the conveyer flights all the way around and boring or forcing the cotton through the trough. This result is due to the offset conveyer and spiked roller. Cotton being spongy and easily packed, is very difficult to handle with the usual conveyer and not only chokes the conveyer and requires considerable power to handle it, but is easily damaged by the rough treatment accorded it in the usual conveyer.

As the cotton is fed to the screw it is carried along to the chutes 24 which are filled, and the overflow is carried back to the wagon 11 and is fed back through the pipe 12 to the separator. If desired, however, the gate 28 may be opened and the overflow dropped on the floor to be picked up by the suction telescope 29 and carried back to the separator. Preferably, the overflow is dropped back into the wagon, and consequently the driver is able to see whether he is feeding the cotton too fast or not fast enough.

The spiral conveyer flights move upwardly on the carrying side of the trough, as shown by the arrow in Figure 4, and this feature together with the inclined side of the conveyer trough and the light spongy nature of the cotton coupled with the fast lateral motion imparted by the rotation of the conveyer, serves to float the cotton along on the side of the conveyer. The upward movement of the conveyer flight continuously tosses the cotton upwardly and the inclined side of the trough tends to support the cotton in this position. Consequently all of the cotton will not drop into the gin feeders but some of the cotton will be carried past the openings in the trough. As a result the gin feeders will start to fill at substantially the same time, and it is, therefore, not necessary to wait for each successive feeder to be filled before starting the gins, for as some of the first cotton to enter the trough will be dropped into each gin feeder there will be enough cotton in each gin for starting all of the gins. This result is peculiar to the conveyer system shown in the drawings and is in direct contrast to the form of conveyers formerly used, such as the spiked belt conveyer which does not start to fill the second gin feeder until the first gin feeder is completely filled, thereby causing a long delay before the gins may all be started.

By reason of the screw conveyer and spiked roller, none of the cotton is left in the trough and consequently, one man's cotton or seed will not be mixed with that of another.

In setting up my conveyer, care must be taken to properly time the spiked roller and screw conveyer in order to prevent interference of the two spirals. Any number of spikes may be used, and it is not necessary to use spikes, as a roller having a solid, continuous spiral could be used, if desired, thereby forming a spiral screw meshing with the spiral conveyer.

While I have shown and described the preferred embodiment of my invention it is to be understood that various changes in the size, shape and arrangement of parts may be resorted to without departing from the spirit of my invention or the scope of the subjoined claims.

Having thus described my invention, what I claim and desire to protect by Letters Patent is:

1. A cotton conveying system for distributing cotton to the gins comprising a series of gin feeders connected to the gins, a distributing trough connecting the gin feeders, and means in said trough to convey the cotton therethrough and to start to fill the various gin feeders at substantially the same time, whereby the gin feeders are filled substantially simultaneously.

2. A cotton conveying system for distributing cotton to the gins comprising a series of gin feeders connected to the gins, a distributing trough connecting the gin feeders, air separating means associated with said trough and means in said trough to convey the cotton therethrough and to start to fill the various gin feeders at substantially the same time, whereby the gin feeders are filled substantially simultaneously.

3. A cotton conveying system for distributing cotton to the gins comprising means to provide suction in said system, a series of gin feeders connected to the gin, a distributing trough connecting the gin feeders, means to prevent suction entering the distributing trough and means in said trough to convey the cotton therethrough and to start to fill the various gin feeders at substantially the same time, whereby the gin feeders are filled substantially simultaneously.

4. A cotton conveying system for distributing cotton to the gins comprising a series of gin feeders connected to the gin, a distributing trough connecting the gin feeders, air distributing means to carry cotton to said trough, air separating means arranged between the trough and the air distributing means and adapted to separate the air from the cotton before passing the cotton to the trough, and means in said trough to convey the cotton therethrough and to start to fill the various gin feeders at substantially the same time, whereby the gin feeders are filled substantially simultaneously.

5. In a cotton conveying system having a series of gins with hoppers connected thereto, the method of filling said hoppers which consists in the step of beginning to fill the first hopper in the series of gins, and then before said hopper is filled, starting to fill the next adjacent hopper, and after the filling of this hopper is started but not completed, starting to fill the next adjacent hoppers, and continuing to fill all of the hoppers, the filling proceeding substantially simultaneously.

6. In a cotton conveying system having a series of gins with hoppers connected thereto, the method of filling said hoppers without the aid of air, which consists in the step of beginning to fill the first hopper in the series of gins, and then before said hopper is filled, starting to fill the next adjacent hopper and after the filling of this hopper is started but not completed, starting to fill the next adjacent hoppers and continuing to fill all of the hoppers, the filling proceeding substantially simultaneously.

7. A cotton conveying system for distributing cotton to the gins comprising a series of gin feeders connected to the gins, a distributing trough connecting the gin feeders, and a spiral conveyer arranged in said trough and adapted to carry cotton therethrough, said trough having an outwardly inclined wall on its carrying side whereby some of the cotton will be carried past the gin feeders to allow the feeders to start filling at substantially the same time.

8. A cotton conveying system for distributing cotton to the gins comprising a series of gin feeders connected to the gins, a distributing trough connecting the gin feeders, air separating means associated with said trough and a spiral conveyer arranged in said trough and adapted to carry cotton therethrough, said trough having an outwardly inclined wall on its carrying side whereby some of the cotton will be carried past the gin feeders to allow the feeders to start filling at substantially the same time.

9. A cotton conveyer comprising a conveyer trough, a spiral conveyer arranged in said trough, said spiral conveyer being offset horizontally towards the non-carrying side of the trough, whereby the carrying capacity of said conveyer is increased by providing space for a relatively large portion of the cotton to be floated along the trough at the side of the spiral conveyer.

10. A cotton conveying system for distributing cotton to the gins comprising a series of gin feeders connected to the gins, a distributing trough connecting the gin feeders, and a spiral conveyer arranged in said trough and adapted to carry cotton therethrough, said spiral conveyer being offset horizontally towards the non-carrying side of the trough thereby increasing the carrying capacity of the trough and providing space for a large portion of the cotton to be floated along the trough at the side of the spiral conveyer whereby only a portion of the cotton will be dropped into each gin feeder, and the feeders will start to fill at substantially the same time.

11. A cotton conveying system for distributing cotton to the gins comprising a series of gin feeders connected to the gins, a distributing trough connecting the gin feeders, air separating means associated with said trough, and a spiral conveyer arranged in said trough and adapted to carry cotton therethrough, said spiral conveyer being offset horizontally towards the non-carrying side of the trough thereby increasing the carrying capacity of the trough and providing space for a large portion of the cotton to be floated along the trough at the side of the spiral conveyer whereby only a portion of the cotton will be dropped into each gin feeder, and the feeders will start to fill at substantially the same time.

12. A cotton conveyer comprising a conveyer trough having upwardly flared sides, a spiral conveyer arranged in said trough, said spiral conveyer being offset horizontally towards the non-carrying side of the trough, whereby the carrying capacity of said conveyer is increased.

13. A cotton distributor comprising a distributor trough communicating with a set of gin feeders, said trough having upwardly flared sides, means to feed cotton to said distributor trough, and a spiral conveyer rotatably arranged in said trough, said conveyer being mounted off center horizontally so as to provide greater space on the carrying side thereof.

14. A cotton conveyer comprising a conveyer trough, a spiral conveyer arranged for rotation in said trough, and a baffle arranged above said conveyer in proximity thereto, whereby the material being conveyed is prevented from rotating with the conveyer.

15. A cotton conveyer comprising a conveyer trough, a spiral conveyer arranged for rotation in said trough, and a kicker element arranged above said conveyer, whereby the cotton is prevented from rotating with the conveyer and is thrown back to the carrying side of the conveyer.

16. A cotton conveyer comprising a conveyer trough, a spiral conveyer arranged for rotation in said trough, and a kicker element arranged above said conveyer and rotating in the same direction therewith, whereby the cotton is prevented from rotating with the conveyer and is thrown back to the carrying side of the conveyer.

17. A cotton conveyer comprising a conveyer trough having upwardly flared sides, a spiral conveyer arranged to rotate therein, a spiral screw arranged above said spiral conveyer and intermeshing therewith, the spiral screw having the same pitch as the spiral conveyer, and means to rotate the spiral screw at the same speed and in the same direction as the spiral conveyer, whereby the cotton will be prevented from rotating with the spiral conveyer and will be thrown back to the carrying side thereof.

18. A cotton distributor comprising a distributing trough communicating with a series of gin feeders, a spiral conveyer rotatably arranged in said trough, and a spiral screw arranged above said spiral conveyer and intermeshing therewith, means to feed cotton to the trough, and means to rotate the spiral screw in the same direction and at the same speed as the spiral conveyer whereby cotton tending to rotate with the spiral conveyer will be engaged by the spiral screw thereabove and be thrown back to the carrying side of the spiral conveyer.

19. A cotton conveyer comprising a distributor trough communicating with a set of gin feeders, means to convey cotton to said trough, a spiral conveyer arranged for rotation in said trough, and a rotating spiked roller arranged above said spiral conveyer, the spikes of said roller extending between the convolutions of said conveyer, the rotating roller being so timed that the spikes will clear the convolutions of the spiral conveyer.

20. A cotton conveyer comprising a conveyer trough, a spiral conveyer arranged to rotate therein, a roller arranged above said conveyer and having spikes extending between the convolutions of said conveyer, said spikes being arranged in a spiral having the same pitch as the spiral conveyer, and means to rotate the spiked roller at the same speed and in the same direction as the conveyer, whereby the material being conveyed will be prevented from rotating with the conveyer and will be thrown back to the carrying side of the conveyer.

21. A cotton conveyer comprising a conveyer trough, a spiral conveyer arranged for rotation therein, said trough having an outwardly flared wall on its carrying side, and a baffle arranged above said conveyer in proximity thereto to prevent rotation of the cotton with the conveyer.

22. A cotton distributor comprising a conveyer trough having upwardly flared sides, a spiral conveyer rotatably mounted therein, a roller arranged above the conveyer and off center thereof on the non-carrying side of the conveyer, said roller having spikes arranged in a spiral of the same pitch as that of the conveyer, the spikes extending between the convolutions of the conveyer, and means to rotate the roller at the same speed and in the same direction as the conveyer whereby cotton tending to rotate with the conveyer will be engaged by the spikes and thrown back to the carrying side of the conveyer.

23. A cotton conveyor comprising a conveyer trough, a spiral conveyer arranged in said trough, said conveyer being offset horizontally towards the non-carrying side of the trough and a baffle arranged above said conveyer, whereby the material being conveyed is prevented from rotating with the conveyer and is thrown back to the carrying side of the conveyer.

24. A cotton conveyer comprising a conveyer trough, a spiral conveyer arranged in said trough, said conveyer being offset horizontally towards the non-carrying side of the trough and a kicker element arranged above said conveyer, whereby the material being conveyed is prevented from rotating with the conveyer and is thrown back to the carrying side of the conveyer.

25. A cotton conveyer comprising a conveyer trough, a spiral conveyer arranged in said trough, said conveyer being offset horizontally toward the non-carrying side of the trough, a kicker element arranged above said conveyer and rotating in the same direction as said conveyer, whereby the material being conveyed is prevented from rotating with the conveyer and is thrown back to the carrying side of the conveyer.

26. A cotton conveyer comprising a conveyer trough, a spiral conveyer arranged in said trough, said conveyer being offset horizontally toward the non-carrying side of the trough, a kicker element having a plurality of sides arranged above said conveyer and rotating in the same direction as said conveyer, whereby the material being conveyed is prevented from rotating with the conveyer and is thrown back to the carrying side of the conveyer.

27. A cotton conveyer comprising a conveyer trough, a spiral conveyer arranged in said trough, said conveyer being offset towards the non-carrying side of the trough, and a roller arranged above said conveyer and having spikes which extend down between the convolutions of the conveyer, and means to synchronize the rotation of the roller and conveyer, whereby the material being conveyed is prevented from rotating with the conveyer and is thrown back to the carrying side of the conveyer.

28. A cotton conveyer comprising a conveyer trough having upwardly flared sides, a spiral conveyer arranged to rotate therein, said conveyer being offset to provide more space on the carrying side thereof than on the non-carrying side, a roller arranged above said spiral conveyer and having spikes arranged thereon in a spiral having the same pitch as the spiral conveyer, said spikes being adapted to extend down between the convolutions of said conveyer, and means to rotate said spiked roller at the same speed and in the same direction as the spiral conveyer whereby cotton tending to rotate with the spiral conveyer will be caught by the spikes on the roller and thrown back to the carrying side of the conveyer.

29. A cotton distributor comprising a distributor trough communicating with a series of gin feeders, means to feed cotton to said trough, a spiral conveyer rotatably arranged in said trough, said conveyer being offset from the center of the trough, to provide greater space on the carrying side than on the non-carrying side thereof, a rotating spiked roller arranged above the spiral conveyer, the spikes of said roller extending between the convolutions of said conveyer, the rotating roller being so timed that the spikes will clear the convolutions of the conveyer, whereby cotton tending to rotate with the spiral conveyer will be engaged by the spikes on the roller and thrown back to the carrying side of the conveyer.

30. A cotton distributor comprising a distributor trough communicating with a series of gin feeders, means to feed cotton to said trough, a spiral conveyer rotatably arranged in said trough, and offset from the center thereof to provide greater space on the carrying side than on the non-carrying side thereof, a roller arranged above said conveyer and off center to the non-carrying side thereof, said roller having spikes arranged in a spiral of the same pitch as the spiral conveyer, said spikes being adapted to extend down between the convolutions of the spiral conveyer, and means to rotate said spiked roller at the same speed and in the same direction as the spiral conveyer whereby cotton tending to rotate with the conveyer will be engaged by the spikes on the roller and thrown back on the carrying side of said conveyer.

31. A cotton conveyer comprising a distributor trough, a spiral conveyer rotatably arranged therein and off center thereof to provide greater space on the carrying side than on the non-carrying side thereof, a rotating roller arranged above the conveyer and off center thereof on the non-carrying side of the conveyer, said roller having spikes arranged to extend between the convolutions of the conveyer, said roller being so timed that the spikes clear the convolutions of the rotating conveyer whereby cotton tending to rotate with the conveyer will be thrown back to the carrying side thereof by the spikes on the roller.

In testimony whereof I affix my signature.
JAMES T. BEATY.